US011919179B2

(12) United States Patent
Eckelkamp et al.

(10) Patent No.: US 11,919,179 B2
(45) Date of Patent: Mar. 5, 2024

(54) OUT-THE-FRONT KNIFE

(71) Applicant: AOB Products Company, Columbia, MO (US)

(72) Inventors: Brett Eckelkamp, Fulton, MO (US); Michael Cottrell, Ashland, MO (US); Shane Ball, Columbia, MO (US); William Garland, Columbia, MO (US); Brian Steere, Columbia, MO (US); Timothy S. Kinney, Warrenton, MO (US); Seth Wheeler, Columbia, MO (US); Justin Burke, Columbia, MO (US); James Tayon, Moberly, MO (US); Curtis Smith, Columbia, MO (US)

(73) Assignee: AOB Products Company, Columbia, MO (US)

(*) Notice: Subject to any disclaimer, the term of this patent is extended or adjusted under 35 U.S.C. 154(b) by 0 days.

(21) Appl. No.: 17/219,289

(22) Filed: Mar. 31, 2021

(65) Prior Publication Data

US 2021/0299893 A1 Sep. 30, 2021

Related U.S. Application Data

(60) Provisional application No. 63/034,597, filed on Jun. 4, 2020, provisional application No. 63/002,788, filed on Mar. 31, 2020.

(51) Int. Cl.
*B26B 1/08* (2006.01)
*B26B 1/10* (2006.01)

(52) U.S. Cl.
CPC . *B26B 1/08* (2013.01); *B26B 1/10* (2013.01)

(58) Field of Classification Search
CPC .................................. B26B 1/08; B26B 1/10
USPC .................................................. 30/162, 163
See application file for complete search history.

(56) References Cited

U.S. PATENT DOCUMENTS

| | | | |
|---|---|---|---|
| 1,024,749 | A | 4/1912 | Sjoberg |
| 1,083,095 | A | 12/1913 | Hermann |
| 1,453,897 | A | 5/1923 | Vincent |
| 1,859,158 | A | 5/1932 | Pernek, Sr. |
| 2,243,030 | A | 5/1941 | Fischer |
| 2,632,949 | A | 3/1953 | Falcone |
| 2,854,745 | A | 10/1958 | Braverman |
| 3,863,339 | A | 2/1975 | Reaney et al. |
| 4,265,017 | A | 5/1981 | Collins |
| 4,320,576 | A | 3/1982 | Beermann |

(Continued)

OTHER PUBLICATIONS

U.S. Pat. No. 57,902 issued Sep. 11, 1866, Hibbard et al.

(Continued)

*Primary Examiner* — Jennifer S Matthews
(74) *Attorney, Agent, or Firm* — Stinson LLP

(57) ABSTRACT

An out-the-front knife, components thereof, and associated methods. The out-the front knife can be a double-action spring-assisted knife. The knife includes a handle and a blade. The handle includes a rear end and a front opening opposite the rear end. The blade is movable with respect to the handle between stowed and deployed positions. In the stowed position, the blade is biased rearward. The knife includes an actuator movable in a deploying direction to spring the blade forward away from the stowed position toward the deployed position.

26 Claims, 13 Drawing Sheets

(56) References Cited

U.S. PATENT DOCUMENTS

| | | | | |
|---|---|---|---|---|
| 4,393,587 | A | 7/1983 | Kloosterman | |
| 4,523,379 | A | 6/1985 | Osterhout et al. | |
| 5,371,948 | A | 12/1994 | Liffiton | |
| 5,617,635 | A | 4/1997 | Bemns | |
| 5,722,169 | A | 3/1998 | Ozden | |
| 6,085,423 | A | 7/2000 | Marifone | |
| 6,536,115 | B2 | 3/2003 | Tabbi et al. | |
| 6,553,673 | B2 | 4/2003 | Peyrot et al. | |
| 6,775,911 | B2 | 8/2004 | Tremblay | |
| 6,785,966 | B2 | 9/2004 | Berns | |
| 7,086,158 | B1 | 8/2006 | Halpern et al. | |
| 7,305,769 | B2 | 12/2007 | McHenry et al. | |
| 7,562,455 | B2 | 7/2009 | McHenry et al. | |
| 7,596,868 | B2 | 10/2009 | Berns | |
| 7,596,869 | B2 | 10/2009 | Berns | |
| 7,797,838 | B2 | 9/2010 | Chu | |
| D666,887 | S | 9/2012 | Wattenberg | |
| 8,595,941 | B2 | 12/2013 | Lee | |
| 8,671,578 | B1 | 3/2014 | Frazer | |
| 8,769,826 | B2 | 7/2014 | Wu | |
| 8,966,771 | B2 * | 3/2015 | Chu | B26B 1/08 30/162 |
| 9,056,398 | B2 | 6/2015 | Liao | |
| 9,375,854 | B2 | 6/2016 | Chu et al. | |
| 9,498,889 | B1 | 11/2016 | Hawk et al. | |
| 9,676,105 | B2 | 6/2017 | McChesney | |
| 9,764,485 | B1 * | 9/2017 | Hawk | B26B 1/04 |
| 9,784,528 | B2 | 10/2017 | Rockwell | |
| 10,112,312 | B2 | 10/2018 | Schekalla | |
| 10,220,527 | B1 | 3/2019 | Marfione | |
| 10,500,740 | B1 * | 12/2019 | Marfione | B26B 1/08 |
| 10,807,253 | B1 * | 10/2020 | Mandeville | B26B 1/08 |
| 2008/0222897 | A1 * | 9/2008 | Marfione | B26B 1/08 30/162 |
| 2011/0289783 | A1 | 12/2011 | Polyakova et al. | |
| 2012/0255179 | A1 | 10/2012 | Moizis | |
| 2016/0229074 | A1 | 8/2016 | Rohrbach | |
| 2017/0050325 | A1 | 2/2017 | Lee | |
| 2018/0169874 | A1 | 6/2018 | Halucha | |
| 2021/0276204 | A1 * | 9/2021 | Marfione | B26B 1/10 |

OTHER PUBLICATIONS

U.S. Pat. No. 255,847 issued April 4, 1882, Fiske.
U.S. Pat. No. 407,863 issued Jul. 30, 1889, Hunt.
U.S. Pat. No. 413,225 issued Oct. 22, 1889, Coates.
U.S. Pat. No. 472,104 issued Apr. 5, 1892, Von Bultzingslowen.
U.S. Pat. No. 475,306 issued May 24, 1892, Franklin.
U.S. Pat. No. 515,743 issued March 6, 1894, Von Bultzingslowen.
U.S. Pat. No. 705,441 issued Jul. 22, 1902, Putney.
U.S. Pat. No. 825,976 issued Jul. 17, 1906, Neiglick.
U.S. Pat. No. 845,792 issued Mar. 5, 1907, Jenkins.

* cited by examiner

OUT-THE-FRONT KNIFE

CROSS-REFERENCE TO RELATED APPLICATIONS

The present application claims priority to U.S. Provisional Patent App. Nos. 63/002,788, filed Mar. 31, 2020, and 63/034,597, filed Jun. 4, 2020, each of which is hereby incorporated by reference in its entirety for all purposes.

FIELD

The present disclosure generally relates to knives, and more particularly to out-the-front knives or knives having a handle and a blade that is deployable out a front end of the handle.

BACKGROUND

People use deployable blade knives in many situations. Such knives have handles configured to receive a blade of the knife in a stowed position. The blade can be moved from the stowed position to a deployed position when the user desires to use the knife. In some cases, the blade is spring-biased to move the blade to the deployed position for ease of use.

SUMMARY

In one aspect, an out-the-front knife comprises a handle having a rear end and a front opening opposite the rear end. A blade supported by the handle has a cutting edge. The blade is movable with respect to the handle between a stowed position in the handle and a deployed position in which the blade extends out of the front opening. An actuator supported by the handle is movable with respect to the handle in a deploying direction to move the blade forward away from the stowed position toward the deployed position. The actuator being movable in a stowing direction to move the blade rearward away from the deployed position toward the stowed position. A blade driver supported by the handle is configured to spring the blade toward the deployed position responsive to movement of the actuator in the deploying direction. The blade driver is configured to spring the blade toward the stowed position responsive to movement of the actuator in the stowing direction. The blade when in the stowed position is biased rearward. The blade driver includes a blade pusher configured to push the blade forward against said rearward bias responsive to movement of the actuator in the deploying direction. The blade driver being configured to spring the blade toward the deployed position after sufficient forward pushing force is applied to the blade by the blade pusher to overcome the rearward bias.

In another aspect, an out-the-front knife comprises a handle having a rear end and a front opening opposite the rear end. A blade supported by the handle has a cutting edge. The blade is movable with respect to the handle between a stowed position in the handle and a deployed position in which the blade extends out of the front opening. The blade when in the stowed position is biased rearward. An actuator supported by the handle is movable with respect to the handle in a deploying direction to move the blade forward away from the stowed position toward the deployed position. A blade driver supported by the handle includes at least one spring for springing the blade away from the stowed position toward the deployed position. The blade driver includes a first blade pusher and a second blade pusher different from the first blade pusher. The first blade pusher is operatively connected to the spring to transfer spring force from the spring to the blade to spring the blade toward the deployed position. The second blade pusher is configured to push the blade forward against the rearward bias responsive to movement of the actuator in the deploying direction. The first pusher is configured to spring the blade toward the deployed position via spring force from the spring after sufficient forward pushing force is applied to the blade by the second blade pusher to overcome the rearward bias.

In yet another aspect, an out-the-front knife comprises a handle having a rear end and a front opening opposite the rear end. A blade supported by the handle has a cutting edge. The blade is movable with respect to the handle between a stowed position in the handle and a deployed position in which the blade extends out of the front opening. A retainer is configured to engage the blade in rearward biasing engagement to bias the blade rearward when the blade is in the stowed position. An actuator supported by the handle is movable with respect to the handle in a deploying direction. The actuator is operatively connected to the blade to cause the blade to move forward away from the stowed position toward the deployed position responsive to movement of the actuator in the deploying direction. The blade includes a ramp configured to move the retainer out of rearward biasing engagement with the blade when sufficient force is applied to the actuator in the deploying direction to overcome the rearward bias.

Other objects and features of the present disclosure will be in part apparent and in part pointed out herein.

BRIEF DESCRIPTION OF THE DRAWINGS

Corresponding reference numbers indicate corresponding parts throughout the drawings.

DETAILED DESCRIPTION

Figure 1:
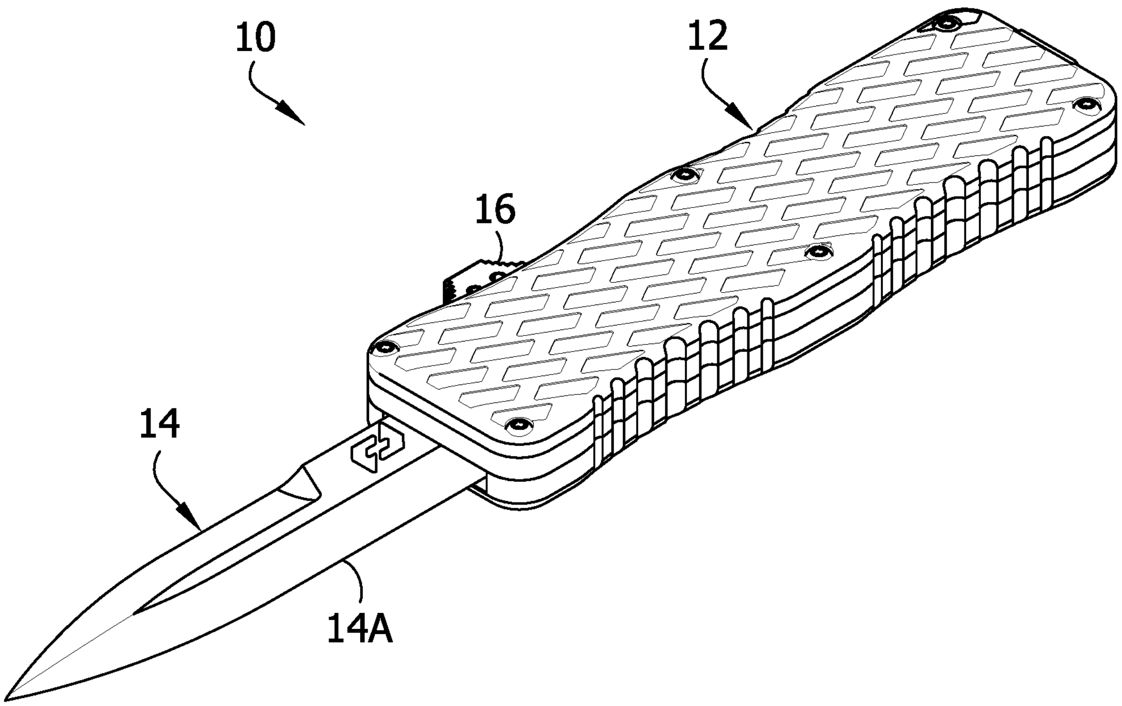
FIG. 1 is a front top perspective of a knife of the present disclosure showing a blade of the knife in a deployed position.

Referring to FIG. 1, an out-the-front knife of the present disclosure is indicated by the reference number 10. In general, the knife includes a handle 12, a blade 14, and an actuator 16. The actuator 16 can be manipulated by a user to expose the blade 14 and hide the blade in the handle 12.

Figure 2:
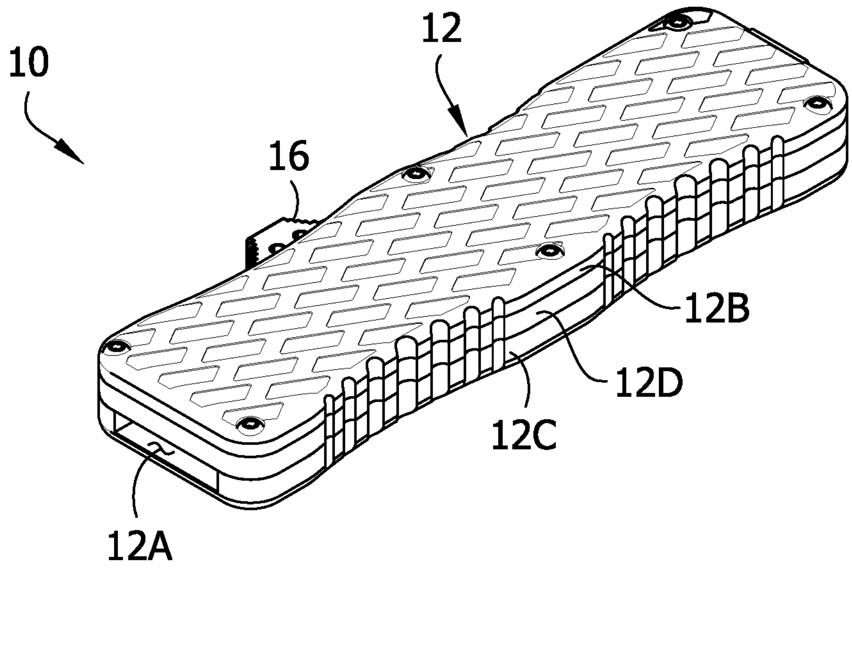
FIG. 2 is a perspective of the knife similar to FIG. 1 but showing the blade in a stowed position.
Figure 3:
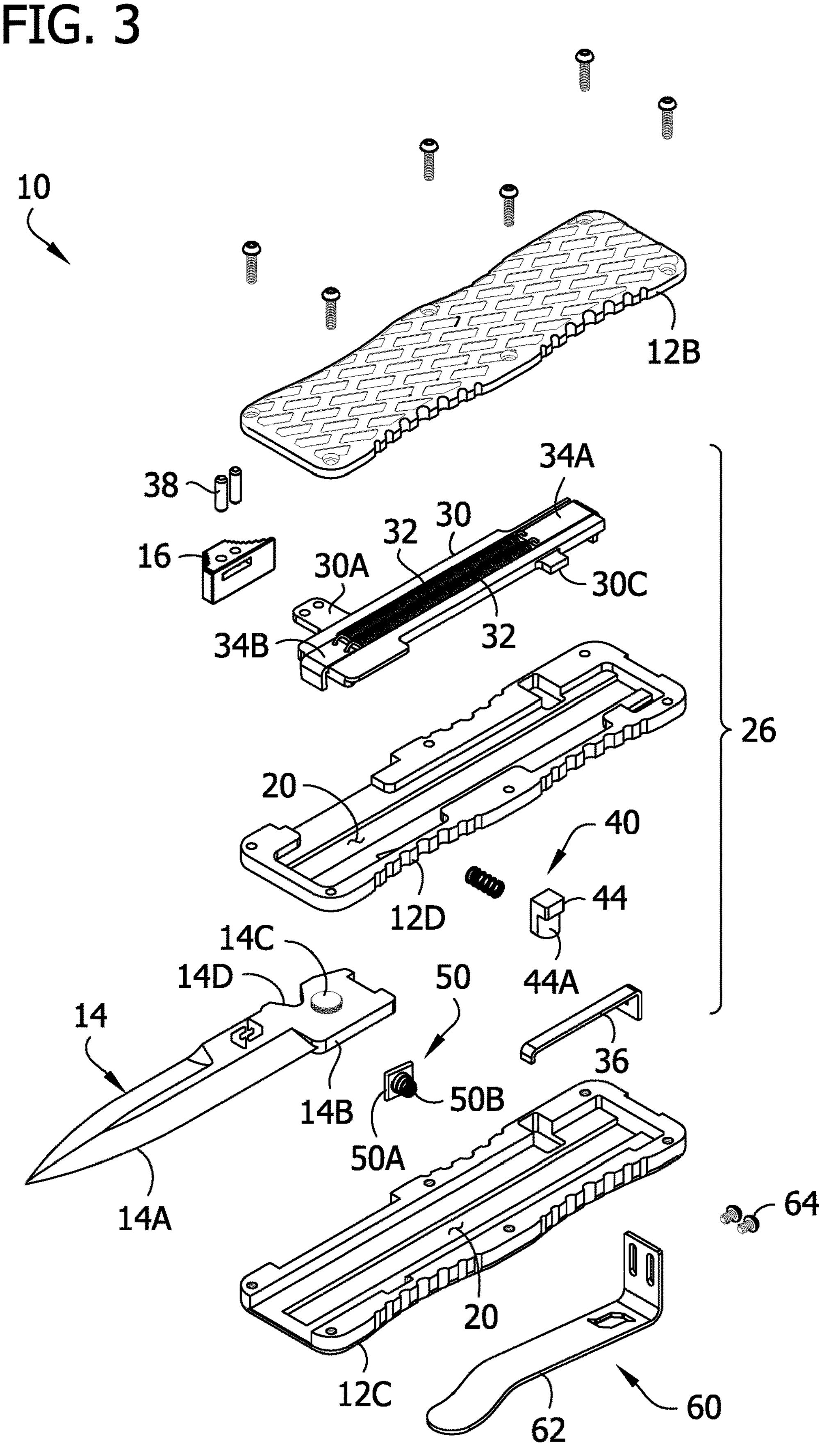
FIG. 3 is an exploded perspective of the knife.
Figure 4:
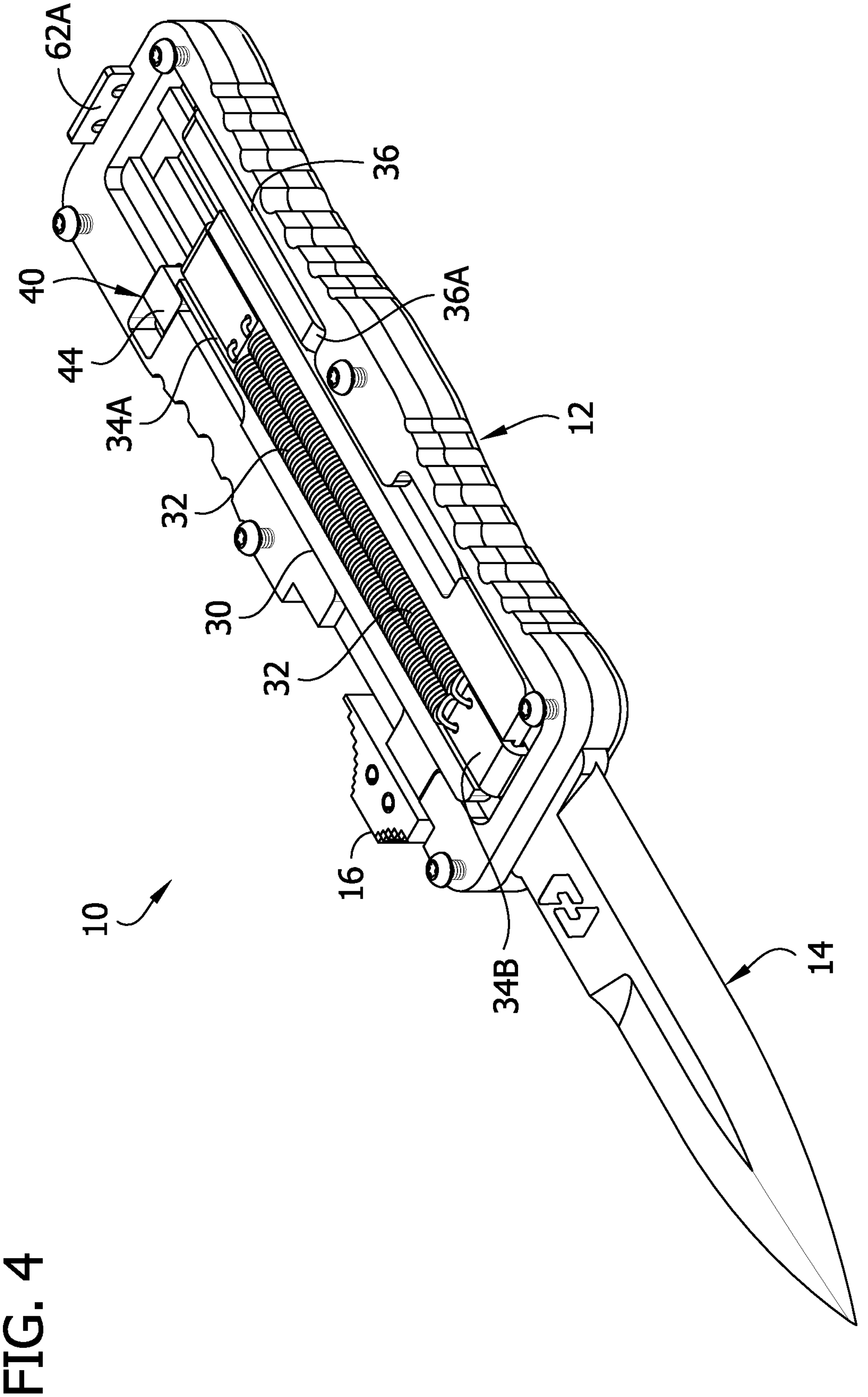
FIG. 4 is a front top perspective of the knife having a top outer handle portion removed to expose interior components.

Referring to FIGS. 1 and 2, the handle 12 has a front end (facing to the left and out of the page), a rear end (facing to the right and into the page), and opposite major side faces and opposite minor side faces extending between the front and rear ends. The handle 12 has a front opening 12A at the front end through which the blade 14 is deployable. Thus, the knife 10 may be referred to as an "out-the-front" knife, meaning the blade 14 is deployable out of the front of the handle 12. As shown in FIGS. 2 and 3, the handle 12 of the illustrated knife 10 includes three handle portions 12B, 12C, 12D. Upper and lower 12B, 12C outer handle portions sandwich an intermediate handle portion 12D. The handle portions can be secured to each other using fasteners such as screws.

The handle 12 defines an interior space comprising a first cavity between the upper outer handle portion 12B and the intermediate handle portion 12D, for housing a first group of internal components (primarily components for driving movement of the blade 14), and a second cavity between the lower outer handle portion 12C and intermediate handle portion, for housing additional internal components (primarily the blade).

The blade 14 has at least one cutting edge 14A. The blade has a tip at its forward end, and includes a tang 14B at its rear end. The blade 14 includes two bosses 14C (broadly, "followers") protruding from opposite sides of the tang 14B, and includes a notch 14D (broadly, "recess"), for reasons which will be explained below. The bosses 14C can be formed by a single cylindrical piece press fitted into a hole in the tang 14B.

The blade 14 is movable with respect to the handle 12 between a stowed position (e.g., FIG. 2) and a deployed position (e.g., FIG. 1). In the stowed position, the blade 14 is located in the handle 12. The cutting edge 14A is inside the handle 12 to protect the cutting edge and/or for safety while storing the knife. In the deployed position, the blade 14 extends out of the front opening 12A of the handle 12 and the cutting edge 14A is exposed for use.

The bosses 14C protruding from the tang 14B are received in respective elongate channels 20 (broadly, "guides"), one of which is provided in the intermediate handle portion 12D, and the other of which is provided in the lower outer handle portion 12C. The elongate channels 20 serve as tracks to guide movement of the blade 14 with respect to the handle 12 and to locate the blade with respect to the handle in the stowed and deployed positions. Opposite sides of the blade tang 14B may also engage opposite interior walls of the lower outer handle portion 12C to guide movement of the blade 14 and maintain a longitudinal axis of the blade extending generally parallel with a longitudinal axis of the handle 12.

The actuator 16 is movable forward (broadly, in a deploying direction) with respect to the handle 12 to move the blade 14 forward away from the stowed position toward the deployed position. The actuator 16 is also movable rearward (broadly, in a stowing direction) to move the blade 14 rearward away from the deployed position toward the stowed position. These operations would normally be performed by one hand of a user while that hand holds the handle 12. For example, while the user's hand holds the handle 12, the thumb of that hand can be used to slide the actuator 16 forward or rearward to extend or retract the blade 14.

The knife 10 includes a blade driver 26 (broadly, "linkage") linking the actuator 16 to the blade 14 to permit movement of the blade by the actuator. The blade driver 26 is configured to spring the blade 14 toward the deployed position responsive to movement of the actuator 16 in the deploying direction. The blade driver 26 is also configured to spring the blade 14 toward the stowed position responsive to movement of the actuator 16 in the stowing direction. Accordingly, the knife 10 can be referred to as a dual-action spring-assisted knife. Other configurations (e.g., single-action spring assisted) can be used without departing from the scope of the present disclosure.

The blade driver 26 includes a slider 30, two springs 32, and three blade pushers 34A, 34B, 36. The slider 30 is captured between the upper outer handle portion 12B and the intermediate handle portion 12D. The slider 30 is movable forward and rearward with respect to the handle 12 conjointly with the actuator 16. The slider 30 includes a tab 30A for connecting the actuator to the slider 16 (e.g., using roll pins 38).

Figure 5:
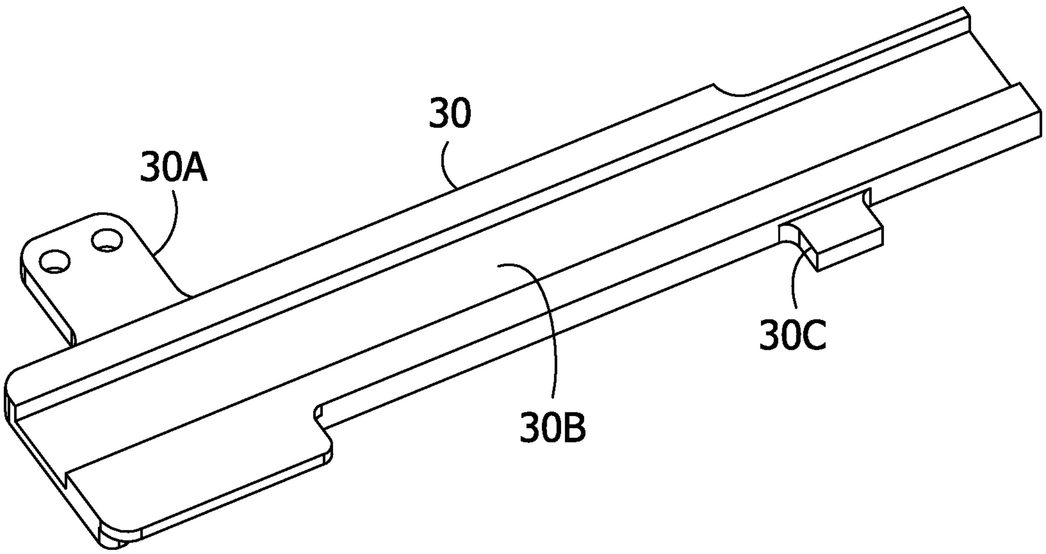
FIG. 5 is a top perspective of a slider of the knife.

Referring to FIG. 5, the slider 30 defines an elongate channel 30B serving as a bed for the two springs 32. Opposite ends of the springs 32 are connected to the first blade pusher 34A and the third blade pusher 34B. The first and third blade pushers 34A, 34B have holes therein for receiving hooked ends of the springs 32. Although some of the drawings may not show the springs 32 connected to both of the first and third blade pushers 34A, 34B, it will be appreciated that such connections would be made in manufacture. For example, the extension springs 32 may be sized such that when the blade driver 26 is at rest the springs are in some tension, forcing the first and third blade pushers 34A, 34B against the opposite ends of the slider 30.

The illustrated first and third blade pushers 34A, 34B comprise brackets including flanges 34A', 34B' extending downward below the slider for engagement with the blade 14. The first and third pushers 34A, 34B transmit spring force from the two springs 32 to the blade 14 to spring the blade toward the deployed position and to spring the blade toward the stowed position. In particular, the first pusher 34A pushes against the rear end of the tang 14B to deploy the blade 14, and the third pusher 34B pushes against a forward end of the boss 14C to retract the blade.

The second blade pusher 36 has a different construction and function from the first and third blade pushers 34A, 34B. The second blade pusher 36 is not connected to the springs 32. The second blade pusher 36 includes a forward head 36A and a rear foot 36B. The head 36A is arranged to be pushed forward by a tab 30C of the slider 30 when the slider is pushed forward. The foot 36B is arranged to be located behind the blade tang 14B for pushing the blade forward when the slider 30 pushes the second blade pusher 36 forward. Operation and function of the second blade pusher 36 will be explained in more detail below. In the illustrated embodiment, the second blade pusher 36 includes a bar 36C extending between the head 36A and the foot 36B, which are formed by flanges bent with respect to the bar. Other configurations can be used without departing from the scope of the present disclosure.

Figure 11:
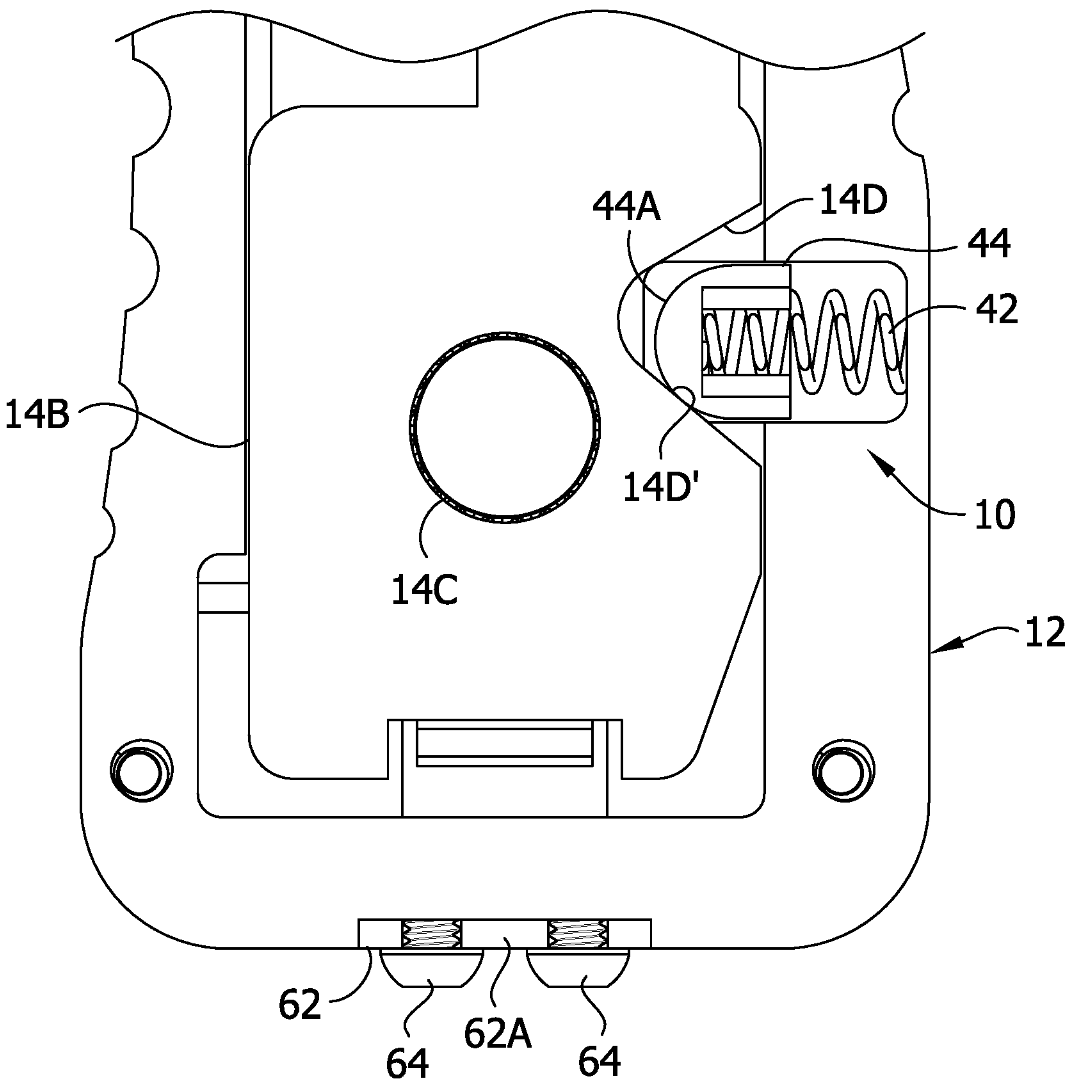
FIG. 11 is an enlarged fragmentary section of the knife in the configuration of FIG. 10 showing the first retainer engaging the blade in rearward biasing engagement.

The knife 10 includes a first retainer 40 configured to retain the blade in the stowed position. In the illustrated embodiment, the retainer 40 comprises a spring 42 and a detent 44 biased by the spring. The detent 44 includes a cam 44A arranged to cam against the notch 14D in the blade tang. The cam 44A includes a rounded cam surface that is received in the notch 14D when the blade 14 is in the stowed position. The blade tang 14B includes a ramp 14D' partially defining the notch, and the cam engages the ramp in the stowed position. As shown in FIG. 11, when the blade 14 is in the stowed position, the cam 44A does not "bottom out" in the notch 14D, and thus remains in engagement with the ramp 14D'. The engagement of the cam 44A with the ramp 14D' can be referred to broadly as rearward biasing engagement. The lateral spring bias of the cam 44A is converted to rearward bias on the blade 14 by the engagement of the cam with the ramp 14D'. There is not sufficient clearance in the rear end of the handle for the tang 14B to move sufficiently rearward for the cam 44A to bottom out in the notch 14D, thus the cam remains in contact with the ramp 14D' when the blade 14 is in the retracted position, biasing the blade toward closure. If the actuator 16 were pushed partially forward and then released before overcoming the rearward bias, the cam 44A would ride laterally outward on the ramp 14D' and then force the blade 14 rearward back to the stowed position when the actuator was released.

Figure 6:
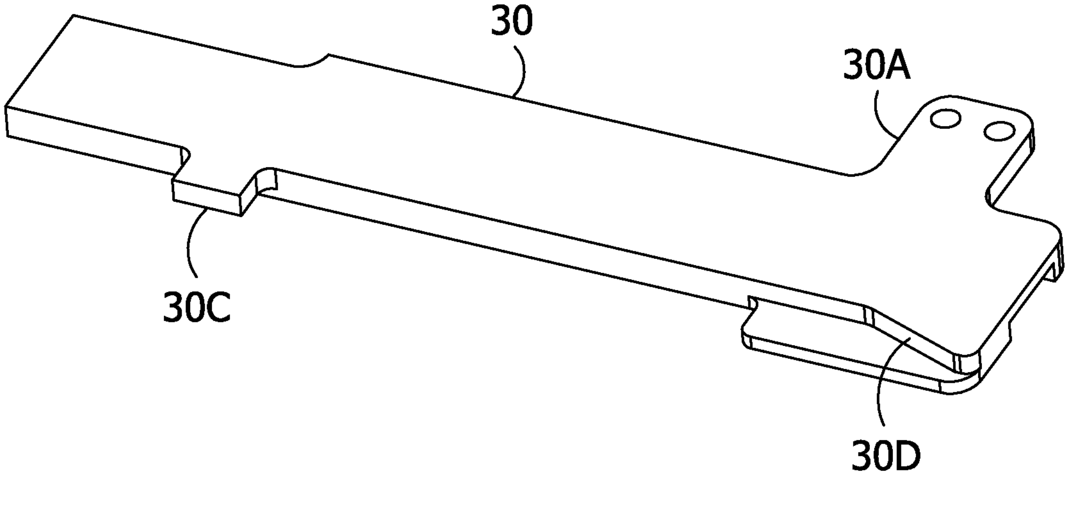
FIG. 6 is a bottom perspective of the slider.
Figure 7:
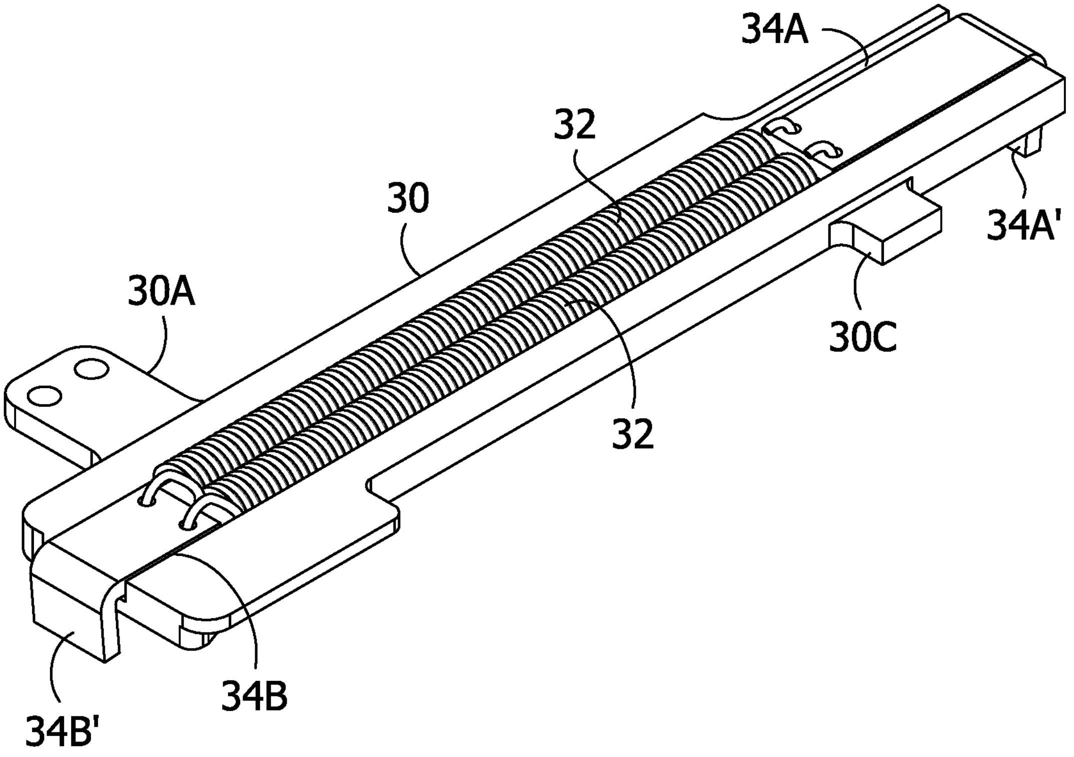
FIG. 7 is a top perspective of the slider with two blade movers and springs connecting the blade movers.
Figure 8:
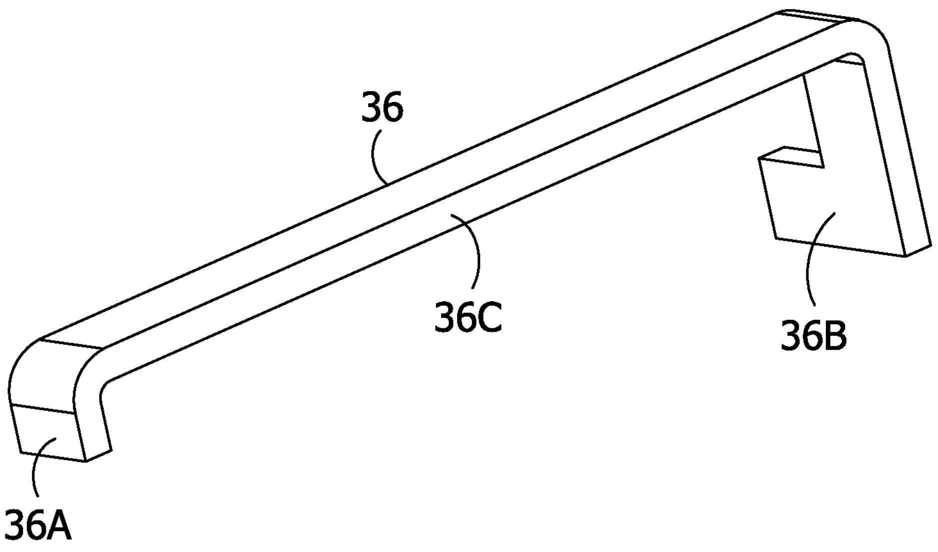
FIG. 8 is a top front perspective of another blade mover of the knife.
Figure 9:
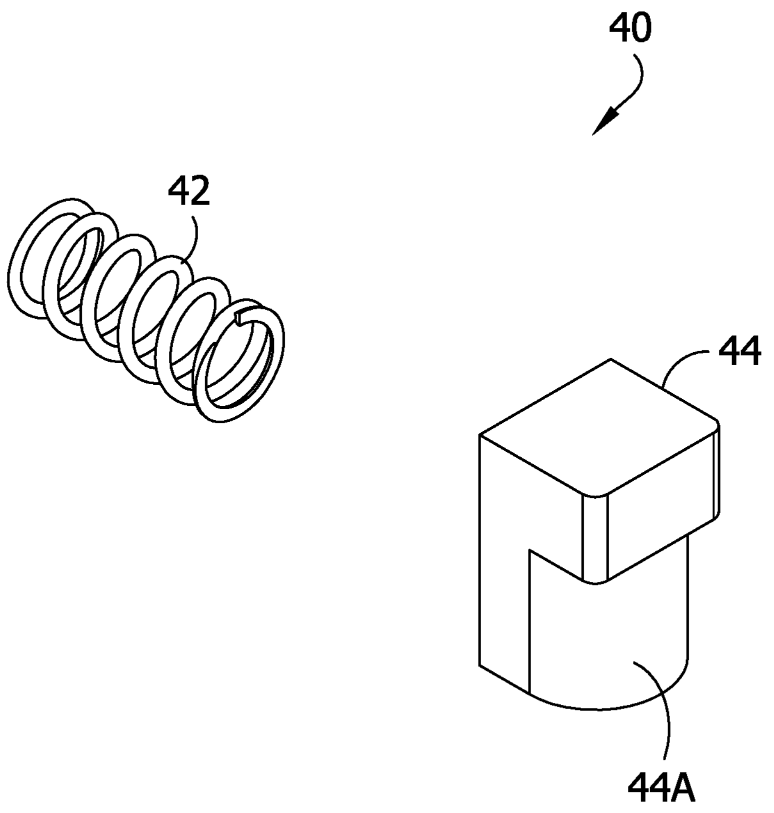
FIG. 9 is a perspective of a first retainer of the knife.
Figure 10:
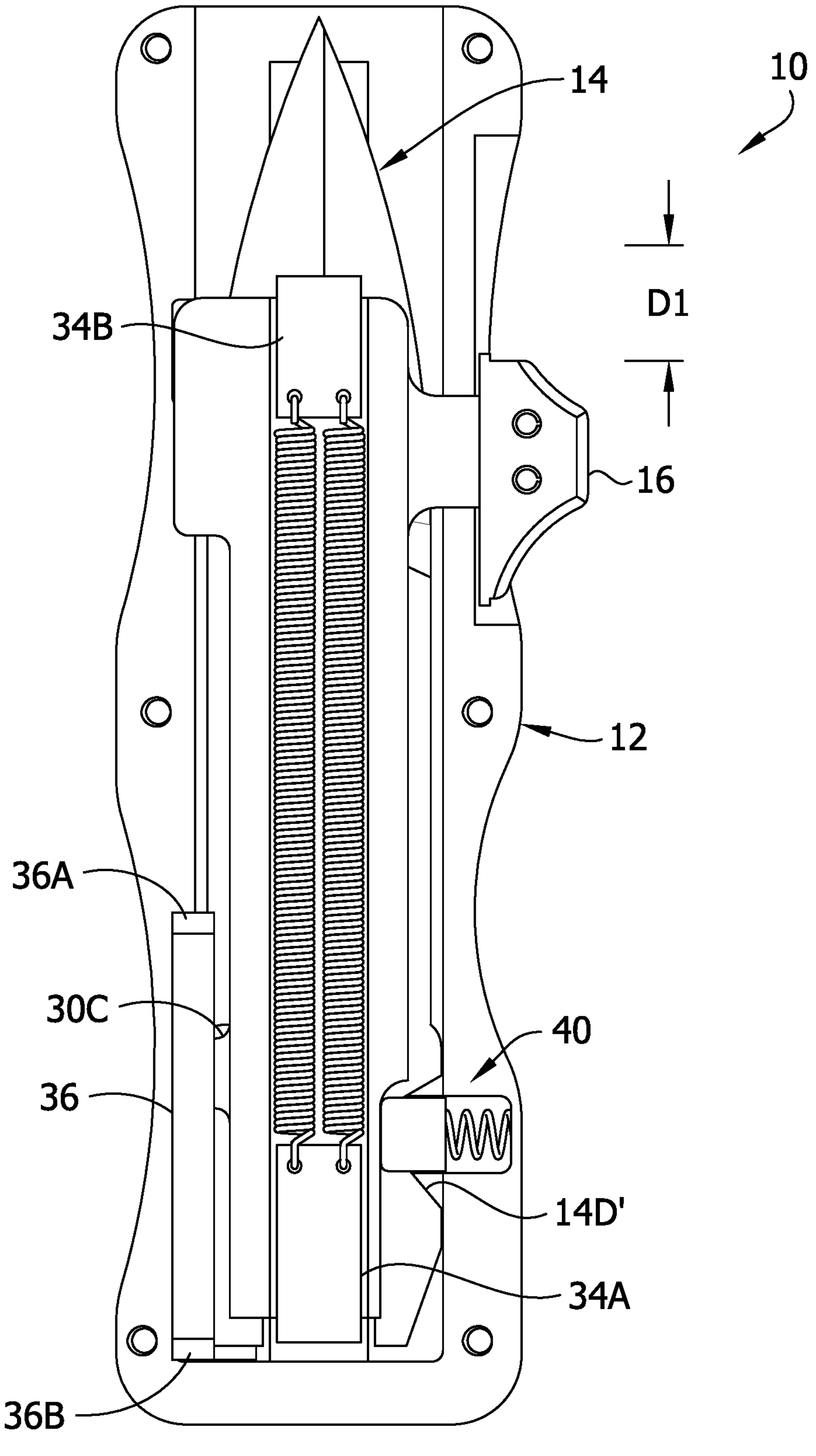
FIG. 10 is a front elevation of the knife having the top outer handle portion removed, with the blade shown in a stowed position.

The knife 10 includes a second retainer 50 configured to retain the blade 14 in the deployed position. In the illustrated embodiment, the second retainer 50 comprises a lever 50A biased by a spring 50B to an extended position in which the lever extends at a skew angle with respect to the longitudinal axis of the handle 12. The lever 50A is located to engage the blade tang 14B to "lock" the blade in the deployed position. The arrangement is such that as the blade 14 moves forward, the front of the tang 14B engages the lever 50A and causes it to temporarily deflect against the spring bias. When the tang 14B passes the lever 50A, it resiliently extends to its extended positon, in which it prevents the tang from retracting into the handle 12. As shown in FIG. 6, the slider includes a second ramp 30D arranged to, as the actuator 16 is moved rearward, engage the lever 50A to move the lever out of retaining engagement with the rear end of the tang 14B, to permit the blade 14 to move toward the stowed position.

Figure 12:
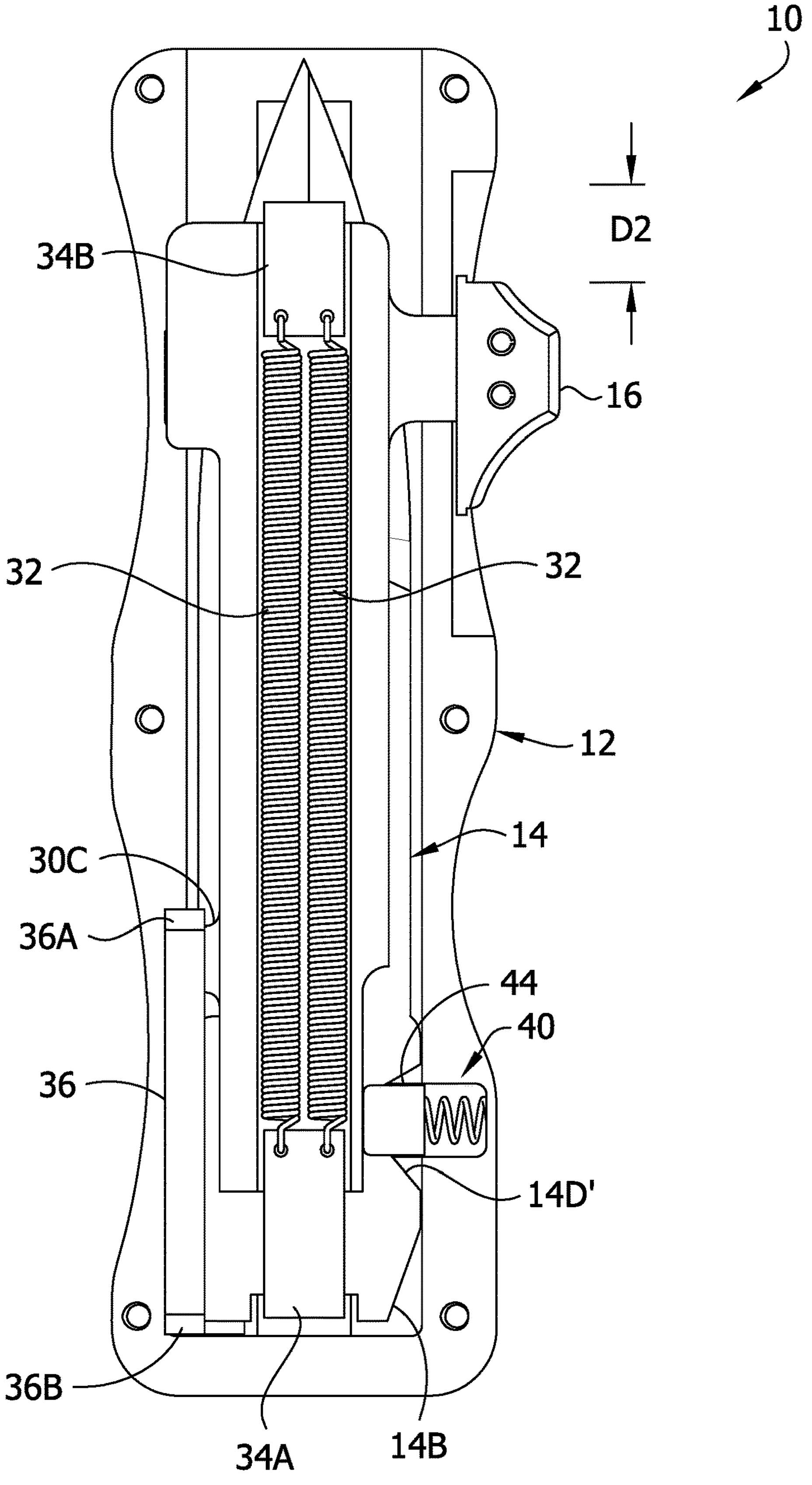
FIG. 12 is front elevation of the knife similar to FIG. 10 but showing an actuator and slider thereof moved forward.
Figure 13:
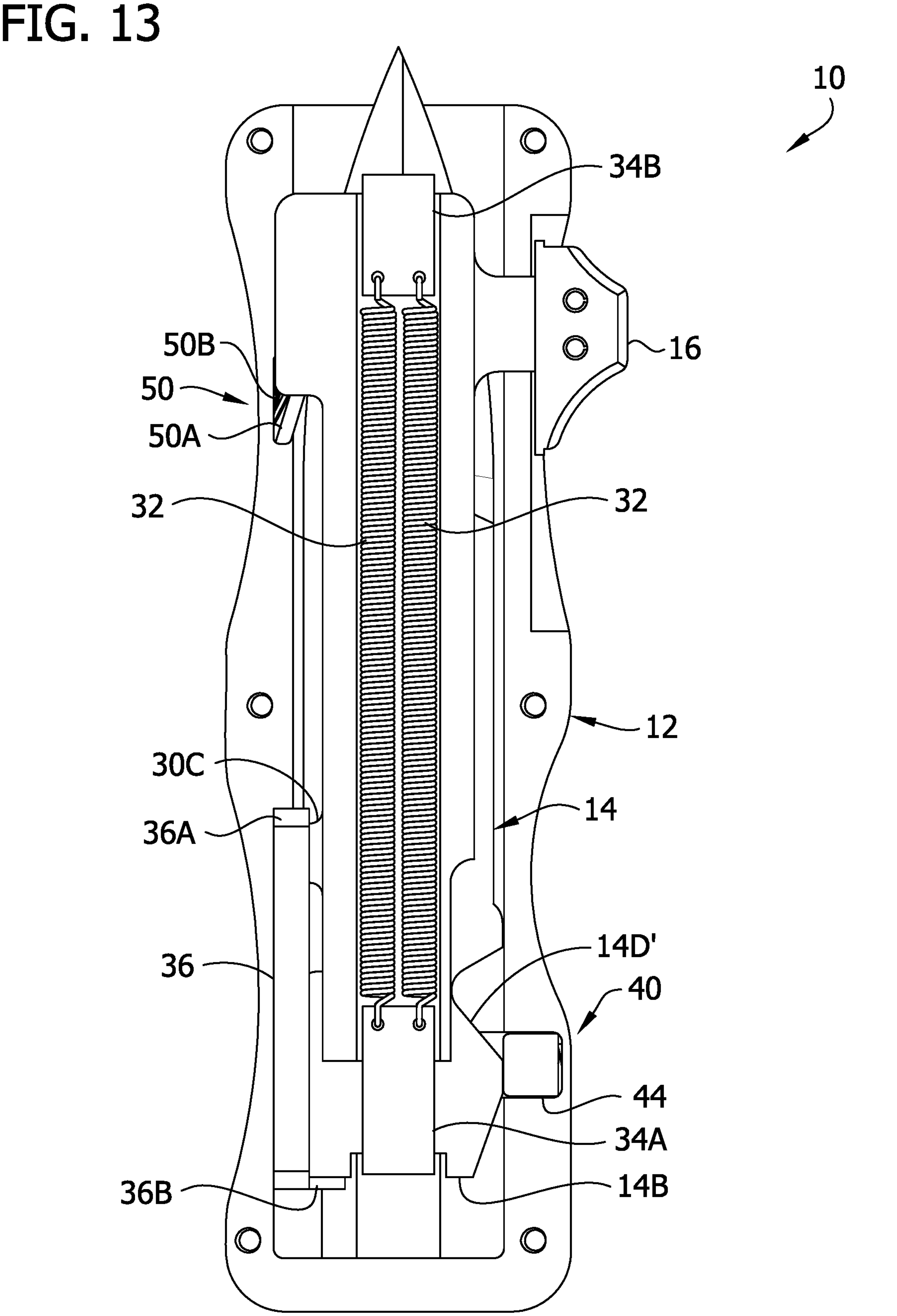
FIG. 13 is a front elevation similar to FIG. 12 but showing the actuator and slider moved farther forward, and the first retainer just having been moved out of rearward biasing engagement with the blade.
Figure 14:
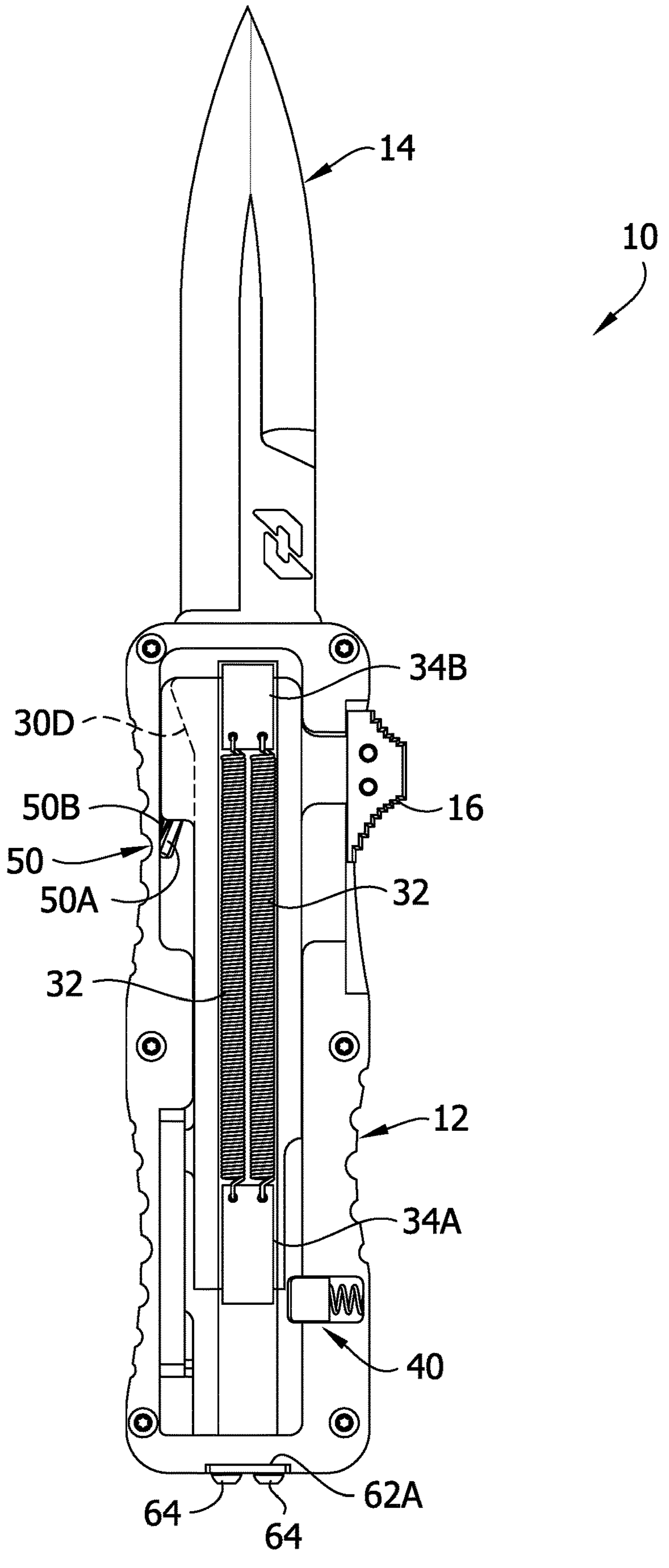
FIG. 14 is a front elevation similar to FIG. 13 but showing the blade having moved to a deployed position, with a second retainer maintaining the blade in the deployed position.
Figure 15:
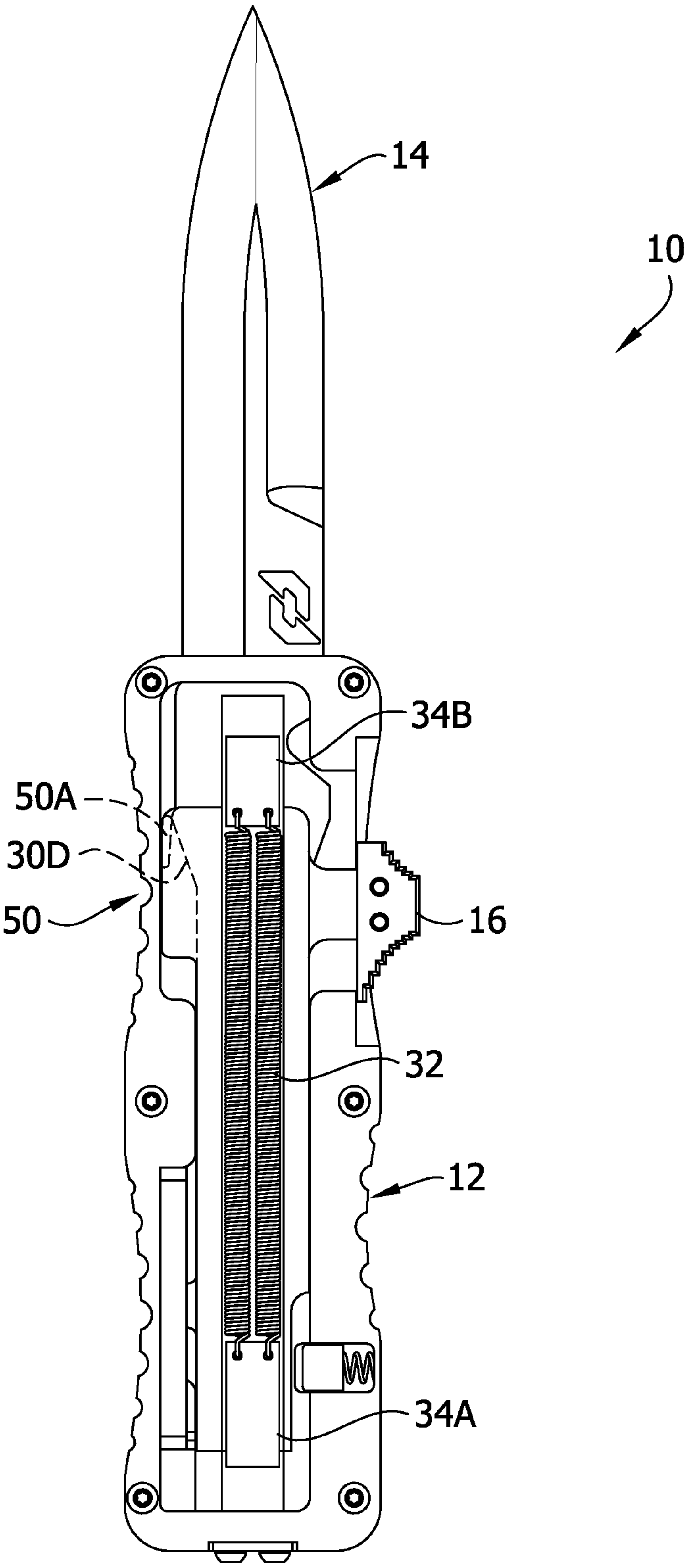
FIG. 15 is a front elevation similar to FIG. 14 but showing the actuator and slider moved rearward, and a ramp of the slider almost releasing the second retainer to permit the blade to spring rearward to the stowed position.
Figure 16:
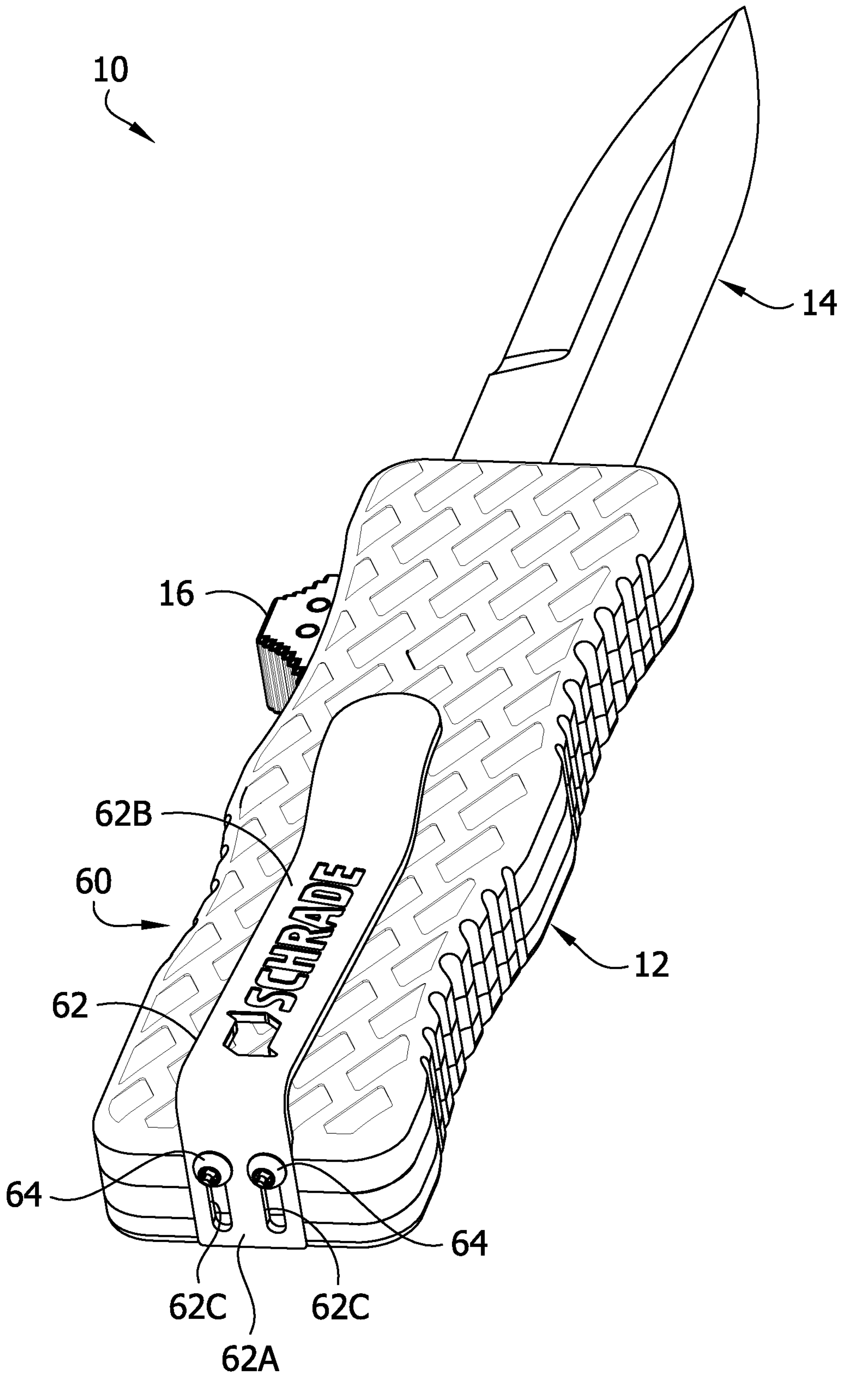
FIG. 16 is a rear perspective of the knife showing features of a clip of the knife.

A cycle of use of the knife 10 will now be discussed with respect to FIGS. 10-15. In a first stage, shown in FIG. 10, the blade 14 is in the stowed position in the handle 12. When the user desires to deploy the blade 14, the user pushes the actuator 16 in the deploying direction (forward). As the actuator 16 travels a first distance D1 in the deploying direction, the slide 30 moves forward, which moves the third blade pusher 34B forward while the first blade pusher 34A remains behind the blade tang 14B, thus creating additional tension in the springs 32. During movement of the actuator 16 in this first distance D1, the slider tab 30C moves forward conjointly with the actuator 16, but does not yet contact the second pusher head 36A because there is a gap between the head and the tab. Referring to FIG. 12, after the actuator travels the first distance D1 forward, the tab 30C contacts the head 36A of the second blade pusher 36, which begins pushing the blade 14 forward via the foot 36B behind the tang 14B. While the actuator 16 is moved the second distance in the deploying direction, the tension continues to build in the springs 32, and the ramp 14D' of the blade 14 starts to push the detent 44 to the side. The detent 44 rides laterally outward on the ramp 14D' as the blade 14 moves forward, but still biases the blade toward the stowed position (toward closure). If the actuator 16 were released by the user before the actuator travels the full second distance D2, the detent 44 would resiliently spring back, pushing against the ramp 14D and causing the blade 14 to resume the stowed position. But if the actuator 16 is pushed the full second distance D2, that means sufficient force has been applied by the user to the actuator to overcome the rearward bias, and the ramp 14D' has pushed the detent 44 out of rearward biasing engagement with the blade 14. The blade 14 is thus free to move forward and is flung forward by the spring force of the springs 32 transmitted to the blade 14 via the first blade pusher 34A. The tang 14B temporarily deflects the second retainer 50, until the tang passes the retainer, which then resiliently extends to lock the blade 14 in the deployed position. It will be appreciated that the knife 10 is free of structure, other than the blade 14 (specifically, the ramp 14D'), configured to engage the first retainer 40 to move the retainer out of rearward biasing engagement with the blade. For example, the slider 30 does not include structure that engages the first retainer 40 to move it out of rearward biasing engagement with the blade 14.

When the user desires to retract the blade 14 to the stowed position, the user applies manual force to the actuator 16 in the stowing direction (rearward). In a first stage of rearward travel of the actuator 16, tension builds in the springs 32. In a second stage of rearward travel of the actuator 16, tension continues to build in the springs 32, and the ramp 30D of the slider 30 contacts the lever 50A of the second retainer 50 and begins moving it out of retaining engagement with the tang 14B. Eventually, the second ramp 30D moves the retainer 50 against its spring bias fully out of retaining engagement with the blade 14, permitting the third blade pusher 34B to fling the blade toward its stowed position via the spring force from the springs 32. As the blade 14 moves rearward, the tang 14B deflects the first retainer 50 until the tang moves sufficiently rearward to permit the first retainer to resiliently extend into the notch 14D, causing the retainer to once again engage the ramp 14D' to maintain the blade 14 in the stowed position and bias the blade rearward while in the stowed position.

The knife 10 includes a clip 60 configured to facilitate connecting the knife to a pocket or a belt of a user. The clip 60 includes an arm 62 secured to the handle 12 by two fasteners 64 threaded into threaded openings in the rear end of the lower outer handle portion 12B. The arm 62 includes a mounting portion 62A and a main body 62B extending generally transversely with respect to the main mounting portion. The mounting portion 62A has two slots 62C in which the fasteners 64 are received. The fasteners 64 are tightened to hold the arm 62 in position with respect to the handle 12, with the mounting portion 62A pressed against the rear end of the handle. The slots 62C permit the arm 62 to be adjusted (inward or outward relative to the handle 12) to apply more or less pressing force of the arm against the side of the handle per user preference. When the arm 62 is in the desired configuration, the fasteners 64 are tightened to hold that configuration. Moreover, the slots 62C permit the clip 60 to be reversible such that the arm 62 can be on the top or bottom of the handle 12. It will be appreciated that the openings receiving the fasteners 64 are offset to the bottom of the handle 12. Accordingly, if the arm 62 is to be mounted to the top side of the handle 12, the mounting portion 62A will need to reach farther to the fastener openings, and the slots 62C permit passage of the fasteners 64 through the mounting portion 62A in such a configuration. The rear ends of the upper and lower handle portions 12A, 12B and of the intermediate handle portion 12C have notches therein to permit generally flush or recessed seating of the mounting portion 62A of the arm 62 against the rear end of the handle 12. Engagement of sides of the mounting portion 62A with side walls of the notches limits rotation of the arm 62 and helps maintain the position of the arm on the handle 12.

It will be apparent that modifications and variations are possible without departing from the scope of the invention defined in the appended claims.

As various changes could be made in the above constructions and methods without departing from the scope of the invention, it is intended that all matter contained in the above description and shown in the accompanying drawings shall be interpreted as illustrative and not in a limiting sense.

What is claimed is:

1. An out-the-front knife comprising:

a handle having a rear end and a front opening opposite the rear end;

a blade supported by the handle, the blade having a cutting edge, the blade being movable with respect to the handle between a stowed position in the handle and a deployed position in which the blade extends out of the front opening; and an actuator supported by the handle, the actuator being movable with respect to the handle in a deploying direction to move the blade forward away from the stowed position toward the deployed position, and the actuator being movable in a stowing direction to move the blade rearward away from the deployed position toward the stowed position;

a blade driver supported by the handle, the blade driver being configured to spring the blade toward the deployed position responsive to movement of the actuator in the deploying direction, and the blade driver being configured to spring the blade toward the stowed position responsive to movement of the actuator in the stowing direction;

wherein the blade when in the stowed position is biased rearward, and the blade driver includes a blade pusher configured to push the blade forward against said rearward bias by contact of the blade with the blade pusher responsive to movement of the actuator in the deploying direction, the blade driver being configured to spring the blade toward the deployed position after sufficient forward pushing force is applied to the blade by the blade pusher to overcome the rearward bias.

2. An out-the-front knife as set forth in claim 1, further comprising a retainer configured to engage the blade in rearward biasing engagement to bias the blade rearward in the stowed position.

3. An out-the front knife as set forth in claim 2, wherein the blade is configured to push the retainer out of rearward biasing engagement with the blade when sufficient force is applied to the actuator in the deploying direction.

4. An out-the-front knife as set forth in claim 3, wherein the blade includes a ramp configured to push the retainer out of rearward biasing engagement with the blade when sufficient force is applied to the actuator in the deploying direction.

5. An out-the-front knife as set forth in claim 3, wherein the knife is free of structure, other than the blade, configured to engage the retainer to move the retainer out of rearward biasing engagement with the blade.

6. An out-the-front knife as set forth in claim 2, wherein the retainer comprises a cam configured to cam against the blade to convert a lateral bias of the cam to the rearward bias of the blade in the stowed position.

7. An out-the-front knife as set forth in claim 6, wherein the blade includes a ramp and the cam is configured to engage the ramp to bias the blade rearward when the blade is in the stowed position.

8. An out-the-front knife as set forth in claim 2, wherein the retainer is retractable from a retaining position in engagement with the blade to a retracted position, the retainer being configured for non-pivoting movement from the retaining position to the retracted position.

9. An out-the-front knife as set forth in claim 2 wherein the retainer is retractable from a retaining position in engagement with the blade to a retracted position, the retainer being configured for generally linear movement from the retaining position to the retracted position.

10. An out-the-front knife as set forth in claim 1, wherein the blade driver includes at least one spring, and the blade driver is configured to create spring force in the spring to spring the blade toward the deployed position responsive to movement of the actuator in the deploying direction.

11. An out-the-front knife as set forth in claim 10, wherein the blade driver is configured to, responsive to movement of the actuator a first distance in the deploying direction, create spring force in the at least one spring, and the blade driver is configured to, responsive to movement of the actuator beyond the first distance in the deploying direction, cause the blade pusher to begin pushing the blade forward toward the deployed position.

12. An out-the-front knife as set forth in claim 1, wherein when the blade is in the stowed position, the actuator is in an at-rest position from which the actuator is movable in the deploying direction.

13. An out-the-front knife comprising:

a handle having a rear end and a front opening opposite the rear end;

a blade supported by the handle, the blade having a cutting edge, the blade being movable with respect to the handle between a stowed position in the handle and a deployed position in which the blade extends out of the front opening, the blade when in the stowed position being biased rearward;

an actuator supported by the handle, the actuator being movable with respect to the handle in a deploying direction to move the blade forward away from the stowed position toward the deployed position; and a blade driver supported by the handle, the blade driver including at least one spring for springing the blade away from the stowed position toward the deployed position, the blade driver including a first blade pusher and a second blade pusher different from the first blade pusher, the first blade pusher being operatively connected to the spring to transfer spring force from the spring to the blade to spring the blade toward the deployed position, the second blade pusher being configured to push the blade forward against the rearward bias responsive to movement of the actuator in the deploying direction, the first pusher being configured to spring the blade toward the deployed position via spring force from the spring after sufficient forward pushing force is applied to the blade by the second blade pusher to overcome the rearward bias.

14. An out-the-front knife as set forth in claim 13, wherein the blade driver is configured to, responsive to movement of the actuator a first distance in the deploying direction, create spring force in the at least one spring for springing the blade toward the deployed position, and the blade driver is configured to, responsive to movement of the actuator beyond the first distance in the deploying direction, cause the second blade pusher to begin pushing the blade forward toward the deployed position.

15. An out-the-front knife as set forth in claim 13, wherein the actuator is movable with respect to the handle in a stowing direction to move the blade rearward away from the deployed position toward the stowed position.

16. An out-the-front knife as set forth in claim 15, wherein the blade driver is configured to spring the blade toward the stowed position responsive to movement of the actuator in the stowing direction.

17. An out-the-front knife as set forth in claim 13, further comprising a retainer configured to engage the blade in rearward biasing engagement to bias the blade rearward in the stowed position.

18. An out-the front knife as set forth in claim 17, wherein the blade is configured to push the retainer out of rearward biasing engagement with the blade when sufficient force is applied to the actuator in the deploying direction.

19. An out-the-front knife as set forth in claim 18, wherein the blade includes a ramp configured to push the retainer out of rearward biasing engagement with the blade when sufficient force is applied to the actuator in the deploying direction to overcome the rearward bias.

20. An out-the-front knife as set forth in claim 18, wherein the knife is free of structure, other than the blade, configured to engage the retainer move the retainer out of rearward biasing engagement with the blade.

21. An out-the-front knife as set forth in claim 17, wherein the retainer comprises a cam configured to cam against the blade to convert a lateral bias of the cam to the rearward bias of the blade in the stowed position.

22. An out-the-front knife comprising:

a handle having a rear end and a front opening opposite the rear end;

a blade supported by the handle, the blade having a cutting edge, the blade being movable with respect to the handle between a stowed position in the handle and a deployed position in which the blade extends out of the front opening;

a retainer configured to engage the blade in rearward biasing engagement to bias the blade rearward when the blade is in the stowed position; and an actuator supported by the handle, the actuator being movable with respect to the handle in a deploying direction, the actuator being operatively connected to the blade to cause the blade to move forward away from the stowed position toward the deployed position responsive to movement of the actuator in the deploying direction;

wherein the blade includes a ramp configured to move the retainer out of rearward biasing engagement with the blade when sufficient force is applied to the actuator in the deploying direction to overcome the rearward bias.

23. An out-the-front knife as set forth in claim 22, wherein the knife is free of structure, other than the blade, configured to engage the retainer to move the retainer out of rearward biasing engagement with the blade.

24. An out-the-front knife as set forth in claim 22, wherein when the blade is in the stowed position, the actuator is in an at-rest position from which the actuator is movable in the deploying direction.

25. An out-the-front knife as set forth in claim 22, wherein the retainer is free of a pivot point.

26. An out-the-front knife as set forth in claim 22, wherein the retainer is retractable from a retaining position in engagement with the blade to a retracted position, the retainer being configured for non-pivoting movement from the retaining position to the retracted position.

* * * * *